US012454051B2

(12) United States Patent
Bianchini et al.

(10) Patent No.: US 12,454,051 B2
(45) Date of Patent: Oct. 28, 2025

(54) SYSTEMS AND METHODS FOR TACTILE GESTURE INTERPRETATION

(71) Applicant: The Board of Trustees of the Leland Stanford Junior University, Stanford, CA (US)

(72) Inventors: Elizabeth Bianchini, Pittsburgh, PA (US); Prateek Verma, Stanford, CA (US); J. Kenneth Salisbury, Jr., Mountain View, CA (US); Etienne Chassaing, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 95 days.

(21) Appl. No.: 18/061,341

(22) Filed: Dec. 2, 2022

(65) Prior Publication Data
US 2023/0173669 A1    Jun. 8, 2023

Related U.S. Application Data

(60) Provisional application No. 63/385,719, filed on Dec. 1, 2022, provisional application No. 63/264,809, filed on Dec. 2, 2021.

(51) Int. Cl.
*A61B 17/29* (2006.01)
*B25J 9/16* (2006.01)
*B25J 13/08* (2006.01)

(52) U.S. Cl.
CPC ............ *B25J 9/1612* (2013.01); *B25J 9/1653* (2013.01); *B25J 13/082* (2013.01); *B25J 13/085* (2013.01)

(58) Field of Classification Search
CPC ...... B25J 13/085; B25J 9/1612; B25J 9/1653; B25J 13/08; B25J 13/082; G05B 2219/36418
See application file for complete search history.

(56) References Cited

U.S. PATENT DOCUMENTS

| 6,817,973 B2 * | 11/2004 | Merril ................... A61B 34/70 600/117 |
| 2017/0007334 A1 * | 1/2017 | Crawford ............... A61B 34/30 |
| 2018/0060459 A1 * | 3/2018 | English .................. G06F 30/20 |

OTHER PUBLICATIONS

Chan et al., Grip forces and load forces in handovers: Implications for designing human-robot handover controllers, 2012, IEEE, p. 9-16 (Year: 2012).*
Parastegari et al., Failure Recovery in Robot-Human Object Handover, 2018, IEEE, p. 600-673 (Year: 2018).*

(Continued)

*Primary Examiner* — McDieunel Marc
(74) *Attorney, Agent, or Firm* — KPPB LLP

(57) ABSTRACT

Systems and methods for facilitating handoffs between a robot and a counterpart in accordance with embodiments of the invention are illustrated. One embodiment includes a method for controlling a robot to handoff an object. The method includes steps for presenting an object to a receiver, moving an object to interrogate a grip stiffness of the receiver, and measuring a response to the moving using a set of one or more sensors. The method further includes steps for computing the grip stiffness of the receiver based on the measured response and determining whether to release the object based on the computed grip stiffness.

20 Claims, 6 Drawing Sheets

(56) References Cited

OTHER PUBLICATIONS

Hoppner et al., The Grasp Perturbator: Calibrating human grasp stiffness during a graded force task, 2011, EEE, p. 3312-3316 (Year: 2011).*
Naeini et al., Novel Dynamic-Vision-Based Approach for Tactile Sensing Applications, 2019, IEEE, p. 1881-1893 (Year: 2019).*
Lambercy et al., A Method to Study Precision Grip Control in Viscoelastic Force Fields Using a Robotic Gripper, IEEE, p. 39-48 (Year: 2014).*
Costanzo et al., Two-Fingered In-Hand Object Handling Based on Force/Tactile Feedback, 2019, IEEE, p. 157-173 (Year: 2019).*
Yussof et al., Application of stiffness control algorithm for dexterous robot grasping using optical three-axis tactile sensor system, 2009IEEE, p. 472-476 (Year: 2009).*
Park et al., Design and Experiment of an Anthropomorphic Robot Hand for Variable Grasping Stiffness, 2021, IEEE, p. 99467-99479 (Year: 2021).*
Sileo et al., Vision based robot-to-robot object handover, 2021, IEEE, p. 664-669 (Year: 2021).*
Kruse et al., A Sensor-Based Dual-Arm Tele-Robotic System, 2015, IEEE, p. 4-18 (Year: 2015).*
Mamaev et al., Grasp Detection for Robot to Human Handovers Using Capacitive Sensors, 2021, IEEE, p. 12552-12558 (Year: 2021).*
Romano et al., Human-Inspired Robotic Grasp Control With Tactile Sensing, 2011, IEEE, p. 1067-1079 (Year: 2011).*
Abowd et al., "Towards a Better Understanding of Context and Context- Awareness", HUC '99: Proceedings of the 1st international symposium on Handheld and Ubiquitous Computing, Jan. 1999, pp. 304-307, doi: 10.1007/3-540-48157-5_29.
Ahmad et al., "CarMap: Fast 3D Feature Map Updates for Automobiles", Proceedings of the 17th USENIX Symposium on Networked Systems Design and Implementation (NSDI '20), Feb. 25-27, 2020, Santa Clara, CA, pp. 1063-1081.
Bailenson et al., "Virtual Interpersonal Touch and Digital Chameleons", Journal of Nonverbal Behavior, vol. 31, 2007, pp. 225-242, doi: 10.1007/s10919-007-0034-6.
Bailenson et al., "Virtual Interpersonal Touch: Expressing and Recognizing Emotions Through Haptic Devices", Human-Computer Interaction, vol. 22, 2007, pp. 325-353.
Barbedo, "Impact of dataset size and variety on the effectiveness of deep learning and transfer learning for plant disease classification", Computers and Electronics in Agriculture, vol. 153, 2018, pp. 46-53.
Bianchini et al., "Towards Human Haptic Gesture Interpretation for Robotic Systems", arXiv:2012.01959v5 [cs.RO], Aug. 5, 2021, pp. 7334-7341.
Brave et al., "Force-Feedback in Computer-Mediated Communication", Universal Access in HCI: Towards an Information Society for All, Proceedings of HCI International '2001 (the 9th International Conference on Human-Computer Interaction), vol. 3, Aug. 5-10, 2001, 7 pgs.
Chan et al., "Implementation of a robot-human object handover controller on a compliant underactuated hand using joint position error measurements for grip force and load force estimations", 2014 IEEE International Conference on Robotics and Automation (ICRA), May 31, 2014-Jun. 7, 2014, pp. 1190-1195, doi: 10.1109/ICRA. 2014.6907004.
Controzzi et al., "Humans adjust their grip force when passing an object according to the observed speed of the partner's reaching out movement", Experimental Brain Research, vol. 236, No. 12, Published online on Sep. 27, 2018, pp. 3363-3377, doi: 10.1007/s00221-018-5381-5.
Dyck et al., "Measuring the Dynamic Impedance of the Human Arm Without a Force Sensor", 2013 IEEE 13th International Conference on Rehabilitation Robotics (ICORR), Jun. 24-26, 2013, 8 pgs.
Eguiluz et al., "Reliable object handover through tactile force sensing and effort control in the Shadow Robot hand", 2017 IEEE International Conference on Robotics and Automation (ICRA), Singapore, 2017, pp. 372-377, doi: 10.1109/ICRA.2017.7989048.
Ellis et al., "Size matters: An empirical study of neural network training for large vocabulary continuous speech recognition", 1999 IEEE International Conference on Acoustics, Speech, and Signal Processing. Proceedings. ICASSP99 (Cat. No. 99CH36258), vol. 2, 1999, pp. 1013-1016.
Elsken et al., "Neural architecture search: A survey", Journal of Machine Learning Research, vol. 20, arXiv: 1808.05377v3 [stat. ML], Apr. 26, 2019, 21 pgs.
Forsslund et al., "WoodenHaptics: A Starting Kit for Crafting Force-Reflecting Spatial Haptic Devices", TEI 2015 - Proceedings of the 9th International Conference on Tangible, Embedded, and Embodied Interaction, Jan. 15-19, 2015, pp. 133-140, doi: 10.1145/2677199. 2680595.
He et al., "Improving human-robot object exchange by online force classification", Journal of Human-Robot Interaction, vol. 4, No., 1, 2015, pp. 75-94, doi: 10.5898/JHRI.4.1.He.
Hill et al., "Real-time Estimation of Human Impedance for Haptic Interfaces", World Haptics 2009 - Third Joint EuroHaptics Conference and Symposium on Haptic Interfaces for Virtual Environment and Teleoperator Systems, 2009, pp. 440-445, doi: 10.1109/whc. 2009.4810893.
Hinton et al., "Distilling the knowledge in a neural network", arXiv: 1503.02531v1 [stat.ML], Mar. 9, 2015, 9 pgs.
Hinton et al., "Reducing the Dimensionality of Data with Neural Networks", Science, vol. 313, No. 5786, Jul. 28, 2006, pp. 504-507, doi: 10.1126/science. 1127647.
Kingma et al., "Adam: A Method for Stochastic Optimization", arXiv: 1412.6980v1 [cs.LG], Dec. 22, 2014, 9 pgs.
Kiranyaz et al., "1D Convolutional Neural Networks and Applications: A Survey", Mechanical Systems and Signal Processing, vol. 151, No. 107398, Apr. 2021, 21 pgs., doi: 10.1016/j.ymssp.2020. 107398.
Konstantinova et al., " Autonomous Object Handover using Wrist Tactile Information", Lecture Notes in Computer Science, 2017, pp. 450-463, doi: 10.1007/978-3-319-64107-2_35.
Lee et al., "Making Sense of Vision and Touch: Self-Supervised Learning of Multimodal Representations for Contact-Rich Tasks", International Conference on Robotics and Automation (ICRA), 2019, pp. 8943-8950, doi: 10.1109/ICRA.2019.8793485.
Li et al., "Connecting touch and vision via cross-modal prediction", Proceedings of the IEEE Conference on Computer Vision and Pattern Recognition, 2019, p. 10609-10618.
Mason et al., "Grip forces when passing an object to a partner", Experimental Brain Research, vol. 163, 2005, pp. 173-187, doi: 10.1007/s00221-004-2157-x.
Mcfee et al., "librosa: Audio and Music Signal Analysis in Python", Proceedings of the 14th python in science conference, vol. 8, 2015, pp. 18-25.
Nagata et al., "Delivery by Hand Between Human and Robot Based on Fingertip Force-Torque Information", IEEE/RSJ International Conference on Intelligent Robots and Systems, Innovations in Theory, Practice and Applications (Cat. No.98CH36190), vol. 2, 1998, pp. 750-757.
Nichols et al., "Muscular Stiffness", Encyclopedia of Neuroscience, Springer, Berlin, Heidelberg, 2009, pp. 2515-2519, doi: 10.1007/ 978-3-540-29678- 2_3687.
Ortenzi et al., "Object Handovers: a Review for Robotics", IEEE Transactions on Robotics, 2021, pp. 1-19, 10.1109/TRO.2021. 3075365.
Palazzolo et al., "Stochastic Estimation of Arm Mechanical Impedance During Robotic Stroke Rehabilitation", IEEE Transactions on Neural Systems and Rehabilitation Engineering, vol. 15, No. 1, Mar. 2007, pp. 94-103, doi: 10.1109/TNSRE.2007.891392.
Pan et al., "Automated detection of handovers using kinematic features", The International Journal of Robotics Research, vol. 36, No. 5-7, Feb. 2017, pp. 721-738, DOI: 10.1177/0278364917692865.
Pan et al., "Fast Handovers with a Robot Character: Small Sensorimotor Delays Improve Perceived Qualities", IEEE/RSJ International Conference on Intelligent Robots and Systems (IROS), 2019, 7 pgs.

(56) References Cited

OTHER PUBLICATIONS

Peeters, , "A large set of audio features for sound description (similarity and classification) in the CUIADO project", IRCAM, Paris, France, Apr. 23, 2004, 25 pgs.

Pettit, "Next Top Model Apple will release a futuristic iPhone with NO ports or holes next year, rumours suggest", retrieved from https://www.the- sun.com/lifestyle/tech-old/845743/apple-iphone-No. ports-or-holes/, date published May 18, 2020, Updated May 19, 2020, 13 pgs.

Piovesan et al., "Arm stiffness during assisted movement after stroke: the influence of visual feedback and training", IEEE transactions on neural systems and rehabilitation engineering: a publication of the IEEE Engineering in Medicine and Biology Society, vol. 21, No. 3, 2013, pp. 454-465, doi: 10.1109/TNSRE.2012.2226915.

Piovesan et al., "Measuring Multi-Joint Stiffness during Single Movements: Numerical Validation of a Novel Time-Frequency Approach", Plos One, vol. 7, No. 3, e33086, Mar. 20, 2012, pp. 1-24, doi: 10.1371/journal.pone.0033086.

Rao et al., "Signal-driven window-length adaptation for sinusoid detection in polyphonic music", IEEE Transactions on Audio, Speech, and Language Processing, vol. 20, No. 1, 2012, pp. 342-348.

Ronneberger et al., "U-net: Convolutional networks for biomedical image segmentation", International Conference on Medical image computing and computer-assisted intervention, Springer, Cham, 2015, arXiv: 1505.04597 [cs.CV], May 18, 2015, pp. 234-241.

Sadigh et al., "Safe Grasping with Multi-Link Fingers Based on Force Sensing", 2009 IEEE International Conference on Robotics and Biomimetics (ROBIO), Dec. 19 -23, pp. 1796-1802.

Smith, "More evidence Apple is working on the buttonless iPhone of our dreams", printed from https://bgr.com/tech/iphone-design-home-button, printed on Apr. 4, 2023, 14 pgs.

Srivastava et al., "Dropout: A Simple Way to Prevent Neural Networks from Overfitting", Journal of Machine Learning Research, vol. 15, No. 1, Jun. 1, 2014, pp. 1929-1958.

Stiles et al., "Mechanical factors in human tremor frequency", Journal of Applied Physiology, vol. 23, No. 3, 1967, pp. 324-330, doi: 10.1152/jappl. 1967.23.3.324.

Strabala et al., "Towards Seamless Human-Robot Handovers", Journal of Human-Robot Interaction, vol. 2, No. 1, Mar. 2013, pp. 1-23, doi: 10.5898/JHRI.2.1.Strabala.

Strabala et al., "Toward Seamless Human-Robot Handovers", Journal of Human-Robot Interaction, vol. 2, No. 1, 2013, pp. 112-132, doi: 10.5898/JHRI.2.1.Strabala.

Sundaralingam et al., "Robust learning of Tactile Force Estimation through Robot Interaction", 2019 International Conference on Robotics and Automation (ICRA), 2019, pp. 9035-9042.

Mgni et al., "The Role of Closed-Loop Hand Control in Handshaking Interactions", IEEE Robotics and Automation Letters, vol. 4, No. 2, 2019, pp. 878-885.

Wu et al., "An Intuitive Formulation of the Human Arm Active Endpoint Stiffness", Sensors, vol. 20, No. 5357, 2020, 15 pgs., doi: 10.3390/s20185357.

* cited by examiner

SYSTEMS AND METHODS FOR TACTILE GESTURE INTERPRETATION

CROSS-REFERENCE TO RELATED APPLICATIONS

The current application claims the benefit of and priority under 35 U.S.C. § 119(e) to U.S. Provisional Patent Application No. 63/264,809 entitled "Tactile Gesture Interpretation for Sensor Systems" filed Dec. 2, 2021 and U.S. Provisional Patent Application No. 63/385,719 entitled "Robot to Human Handovers: Detecting Human Grasp Properties Through Active Sensing" filed Dec. 1, 2022, the disclosures of which are hereby incorporated by reference in their entireties for all purposes.

FIELD OF THE INVENTION

The present invention generally relates to facilitating human robot interactions and, more specifically, using grip stiffness to facilitate handoffs between a robot and a counterpart.

BACKGROUND

Human-robot interactions may be less efficient and communicative than human to human interactions because of a lack of informed sense of touch in robotic systems. Robot success in executing handovers with humans, albeit with substantial reliance on external sensing or with primitive signal processing methods, may be deficient compared to the rich set of information humans can detect. The ability to differentiate tactile gestures may benefit human-robot interactions which may allow robots to successfully execute human-robot physical interactions (e.g. handoffs to humans). However, there exists a dramatic disparity between the efficient, intuitive nature of human to human physical interactions and the often awkward, ill-informed nature of human-robot physical interactions.

SUMMARY OF THE INVENTION

Systems and methods for facilitating handoffs between a robot and a counterpart in accordance with embodiments of the invention are illustrated. One embodiment includes a method for controlling a robot to handoff an object. The method includes steps for presenting an object to a receiver, moving an object to interrogate a grip stiffness of the receiver, and measuring a response to the moving using a set of one or more sensors. The method further includes steps for computing the grip stiffness of the receiver based on the measured response and determining whether to release the object based on the computed grip stiffness.

In a further embodiment, moving an object includes moving the object in a circular pattern.

In still another embodiment, moving an object includes moving the object in a randomized pattern.

In a still further embodiment, moving an object includes moving the object at a specified frequency.

In yet another embodiment, moving an object includes moving the object at several different frequencies.

In a yet further embodiment, moving an object includes moving the object along a specified path for a number of revolutions, where a period of each revolution is between 0.3 s and 0.8 s.

In another additional embodiment, measuring a response includes measuring at least one selected from the group consisting of a magnitude, orientation, velocity, impedance, and acceleration.

In a further additional embodiment, the set of sensors includes a sensor at a distal end of a robot hand.

In another embodiment again, computing the grip stiffness is based on a displacement of the object and a measured force at the sensor at the distal end of the robot hand.

In a further embodiment again, the set of sensors includes at least one selected from the group consisting of a joint force sensor, tactile sensor, an accelerometer, and an image sensor.

In still yet another embodiment, measuring the response includes measuring a response in each of several different directions.

In a still yet further embodiment, computing the grip stiffness includes applying a band-pass filter to the measured response.

In still another additional embodiment, computing the grip stiffness includes modeling a grasp of the object as several orthogonal springs.

In a still further additional embodiment, computing the grip stiffness includes computing a potential energy in a modeled set of springs to define an equivalent spring storing a combined energy in the modeled set of springs for a given displacement.

In still another embodiment again, computing the grip stiffness includes computing an average stiffness in several directions around the object.

In a still further embodiment again, computing the grip stiffness includes computing a grip stiffness for each of several directions around the object.

In yet another additional embodiment, the grip stiffness is represented as at least one selected from the group consisting of a matrix and an ellipse.

In a yet further additional embodiment, the method further includes steps for performing a classification for a gesture based on the measured response, wherein determining whether to release the object is further based on the classification.

In yet another embodiment again, the classification is used to predict at least one selected from the group consisting of a gesture type and a grasp quality.

In a yet further embodiment again, determining whether to release the object comprises comparing the computed grip stiffness to a threshold grip stiffness, and determining to release the object when the computed grip stiffness exceeds the threshold grip stiffness for a predetermined period of time.

One embodiment includes a gesture interpretation device comprising a sensor, and a gesture classifying unit which is fed force data from the sensor. The gesture classifying unit is configured to calculate one or more features from the force data and classify the force data based at least partially on the one or more features in order to determine the presence and type of a tactile gesture.

In another additional embodiment again, the sensor includes a force sensor.

In a further additional embodiment again, the sensor includes a single channel force sensor or a multi-channel force sensor.

In still yet another additional embodiment, the multi-channel force sensor includes a multi-axis force sensor with each channel corresponding to an axis.

In a further embodiment, the sensor includes an accelerometer.

One embodiment includes a method for using force sensor data to determine the presence of a tactile gesture. The method includes steps for providing force data including data based on a tactile gesture, calculating one or more features from the force data, and classifying the force data based at least partially on the one or more features in order to determine the presence and identity of the tactile gesture.

In still another embodiment, the one or more features is selected from the group consisting of raw force data, slope, duration of high slope, curvature, duration of high curvature, standard deviation, third-order polynomial fit, tap profile, spectrogram slice linear approximation, spectral rolloff, centroid, and flatness.

In a still further embodiment, calculating one or more features includes compressing the force data and calculating the one or more features based on the compressed force data.

In yet another embodiment, compressing the force data is performed by principal component analysis, independent component analysis, or autoencoder model bottlenecks.

In a yet further embodiment, calculating one or more features is performed manually or generated via a neural network through an autoencoder.

In another additional embodiment, classifying the one or more features is performed by the group consisting of a decision tree, a support vector machine (SVM), and a neural network classifier.

In a further additional embodiment, classifying the force data identifies probabilities of tactile gestures from a predetermined set of tactile gestures.

In another embodiment again, the predetermined set of tactile gestures includes tap, touch, grab, and/or slip.

In a further embodiment again, the method further includes steps for determining one or more snippets of the force data, wherein calculating the one or more features is performed at least partially on the one or more snippets.

One embodiment includes a robotic system comprising a sensor mounted on a moveable arm and a gesture classifying unit which is fed the force data from the sensor. The sensor is configured to gather force data when the sensor is moved and the gesture classifying unit is configured to calculate one or more features from the force data and classify the one or more features in order to identify the tactile gesture.

One embodiment includes a method of facilitating handoff of an object between a robot and a recipient. The method includes steps for providing the robot including a moveable arm and a force sensor, handing an object from the robot to the recipient while gathering force data from the force sensor and while the force sensor is actively moved, calculating stiffness of the recipient's grip of the object while handing the object based on the force data, and gradually adjusting the robot's grip on the object based on the changes in the stiffness of the recipient's grip of the object until the robot fully releases the object.

One embodiment includes a method of facilitating handoff of an object between a robot and a giver. The method includes steps for providing the robot including a moveable arm and the force sensor, handing an object from the giver to the robot while gathering force data from the force sensor and while the force sensor is actively moved, calculating stiffness of the giver's grip of the object while handing the object based on the force data, and gradually adjusting the robot's grip on the object based on the changes on in the stiffness of the giver's grip of the object until the giver fully releases the object.

In still yet another embodiment, the method further includes steps for recording the force data and the position of the force sensor. Calculating stiffness is based on the recorded force data and the position of the force sensor.

In a still yet further embodiment, the method further includes steps for calculating a stiffness matrix based on the calculated stiffness.

In still another additional embodiment, the method further includes steps for comparing the calculated stiffness matrix to a previously stored stiffness profile to classify a stiffness profile for the recipient or the giver.

In a still further additional embodiment, the previously stored stiffness profile includes the stiffness matrix for different grasps of the object by the recipient or the giver.

In another embodiment, the stiffness matrix is used to calculate a stiffness ellipsoid.

In still another embodiment again, the force sensor and positional sensor are mounted on a hand which is mounted on the end of the moveable arm.

In a still further embodiment again, the hand is configured to grasp the object and variably adjust grip.

In yet another additional embodiment, the moveable arm is moveable through actuators, motors, and/or servos.

In a yet further additional embodiment, the robot further includes a positional sensor configured to sense the position of the force sensor.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, systems and methods in accordance with many embodiments of the invention can be used to control handoffs of objects between a robot and a receiver (e.g., a human). While such interactions are often intuitive and simple for humans, coordinating handoffs between a robot and human receiver present many technical difficulties, in particular with determining whether the human counterpart has a firm grip on the object. Systems and methods in accordance with some embodiments of the invention provide for novel methods for evaluating the grip of the human to assist in the handoff of an object.

Figure 1:
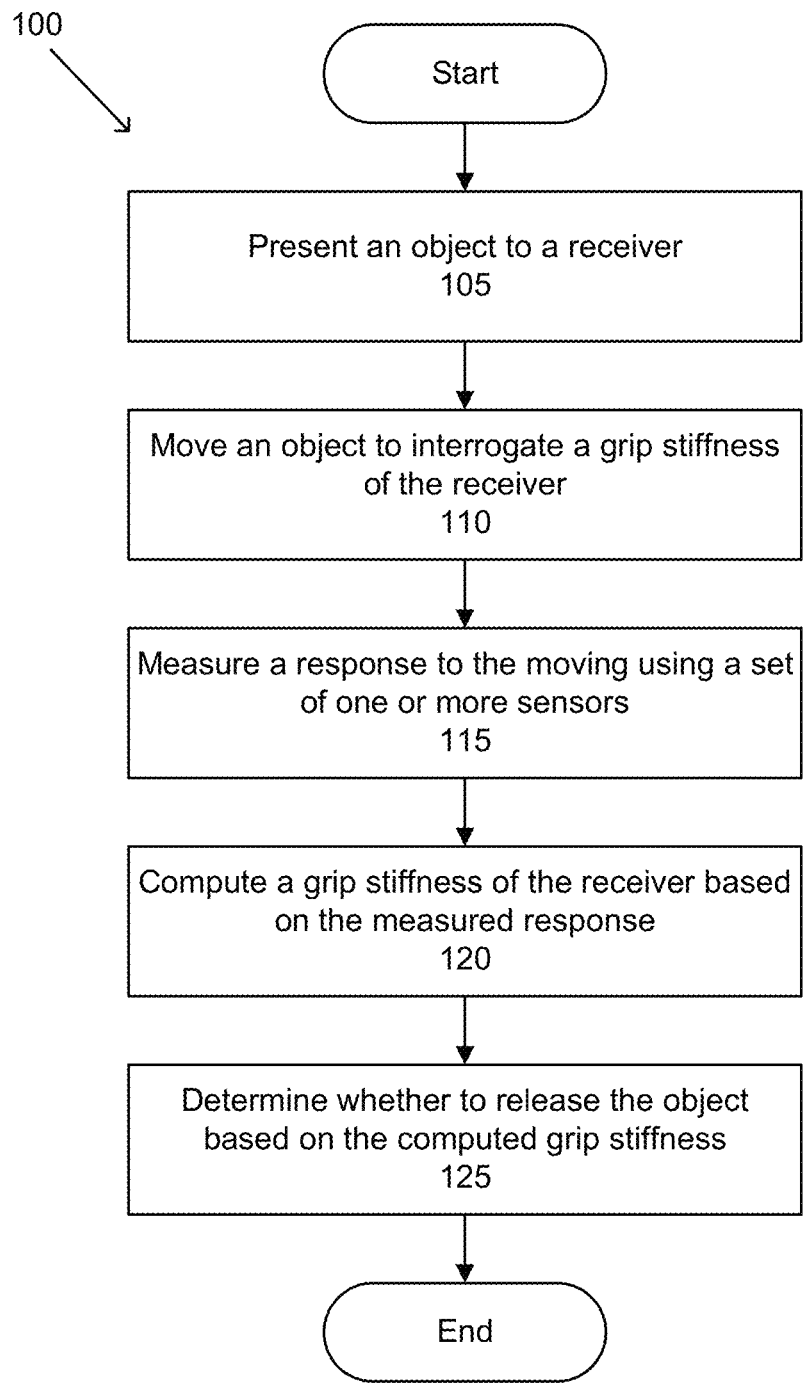
FIG. 1 illustrates an example process for a handoff in accordance with an embodiment of the invention.

An example process for a handoff in accordance with an embodiment of the invention is illustrated in FIG. 1. Process 100 presents (105) an object to a receiver. In a variety of embodiments, presenting an object can include moving and/or positioning an object so it can be grasped by a receiver.

Process 100 moves (110) the object to interrogate a grip stiffness of the receiver. Interrogating movements of the object in accordance with many embodiments of the invention can be controlled to gather information about grip stiffness in each of several different directions. Processes in accordance with a variety of embodiments of the invention can use one or more probing movements to determine grip stiffness for a given exchange.

In this description, interrogating movements of the object for active perception refer to movements of the object other than those required to move an object toward the receiver. In many embodiments, such movements of the object are small, limiting movement of the object (or an end of the object) to be small enough for the movements to be linearized and small-signal analysis of system dynamics can be used. For example, processes in accordance with some embodiments of the invention may limit movements to within a radius of 0.15 mm. Other small movements (e.g., within a radius of 1 cm) may be used without departing from the scope of the invention.

In several embodiments, processes can move the object in a variety of ways that may vary along a variety of parameters, such as (but not limited to) path, direction, amplitude, frequency, speed, etc. Paths in accordance with a number of embodiments of the invention can include circular paths, random paths, linear paths, etc. Amplitudes in accordance with a number of embodiments of the invention can allow for movement at varying distances from a center position. In a number of embodiments, frequencies can be targeted to perform a single probe within a target time window (e.g., 0.5 s to 0.8 s). In several embodiments, one or more of the parameters may vary within a single probe.

Process 100 measures (115) a response to the moving using a set of one or more sensors. In a variety of embodiments, processes measure a resistance and/or impedance of attempted movements of an object (e.g., as a force required for movement and/or a difference in actual movement compared to expected movement). Measuring responses in accordance with a number of embodiments of the invention can utilize one or more sensors, such as (but not limited to) force sensors, positional sensors, tactile sensors at the fingertips, accelerometers, image sensors, etc. In some embodiments, sensors are positioned at joints of a robot arm (e.g., at a wrist, distal end of a robot hand, elbow, etc.) to measure various characteristics of movements of the object, such as (but not limited to) magnitude of movements, orientations, impedance of the attempted probing movements of the object, velocity, acceleration, etc. In many embodiments, only measurements of forces acting on the robot gripper (e.g., through wrist and/or joint force sensors) can be used to detect grip stiffness.

Process 100 computes (120) a grip stiffness of the receiver. In a variety of embodiments, grip stiffness can be computed based on displacement resistance and/or energy tracking. Displacement resistance in accordance with some embodiments of the invention can use the measured the resistance and/or impedance of attempted movements of an object (e.g., as a force required for movement and/or a difference in actual movement compared to expected movement). Energy tracking in accordance with certain embodiments of the invention can compute a potential energy in one or more springs to define an equivalent spring storing the combined energy in the springs for a given displacement. In certain embodiments, energy tracking can provide an average stiffness in all directions to represent grip stiffness.

In some embodiments, grip stiffness is measured in multiple directions for each probe. Processes in accordance with various embodiments of the invention model the grip stiffness as two or more orthogonal springs. In several embodiments, movements of an object are limited so that such movements are locally linear. Grip stiffness in accordance with various embodiments of the invention is described in greater detail below.

Process 100 determines (125) whether to release the object based on the computed grip stiffness. In various embodiments, processes can determine to release an object when a grip stiffness exceeds a given threshold. Processes in accordance with a variety of embodiments of the invention may require that the grip stiffness exceed a threshold for a predetermined amount of time to reduce the incidence of unintentional drops.

In a number of embodiments, processes can use additional information to determine whether to release an object. Processes in accordance with numerous embodiments of the invention can classify a gesture of the receiver and determine whether to release the object based on a combination of the computed grip stiffness and the predicted gesture. Classification of gestures in accordance with a number of embodiments of the invention is described in greater detail below.

While specific processes for handing off an object are described above, any of a variety of processes can be utilized to hand off objects as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although many of the examples described herein describe a handoff from a robot to a human receiver, one skilled in the art will recognize that similar systems and methods can be used in a variety of applications, including (but not limited to) a handoff from a human to a robot receiver, robot to robot handoffs, etc., without departing from this invention.

A. Grip Stiffness

When humans hand off an object from one person to another, many physical cues may mediate the transfer. When a robot hands an object to a human, the robot must know when to let go of the object or the object may fall to the ground. It has been discovered that there are subtle cues that reveal how securely the human recipient is holding the object being received by the robot. These cues may be sensed by measuring the impedance or stiffness of the recipient's grasp. Some embodiments of the disclosed technology relate to detecting secure grasps by actively measuring, through active interrogation or active perception, the stiffness of the recipient's grasp. Some embodiments include making subtle movements of the robot and measuring force responses. By measuring the resulting force-displacement relationship, the impedance (or more specifically, stiffness) of the human's grasp of the object can be determined. The grasp impedance may be a more general grasp property than stiffness. Stiffness may be a subset of impedance. While stiffness is discussed in the present disclosure, it is understood that the more general concept of impedance may be used to aid in human-robot handoffs.

A stiffer grasp is more secure than a looser grasp. Due to the biomechanical properties of muscle, the higher the force exerted by a muscle, the stiffer it becomes. Therefore, the magnitude of the human's grasp forces can be inferred by measuring the stiffness of the human's grasp. A second reason a stiff grasp is more secure is that unexpected forces (collisions, accelerations, etc.) may not displace the object significantly from its desired position. By tracking the stiffness of the human's grasp, the robot may be able to determine when it can safely let go of the object being passed.

Systems and methods in accordance with many embodiments of the invention may measure the stiffness of the human's grasp on the object that the robot is handing to the human. In many embodiments, detecting the (changing) security of the recipient's grasp can be performed using active mechanical interrogation achieved by moving the robot through very small motions and tracking force variations. Small motions allow for grasp stiffness to be computed with an assumption of local linearity. In some embodiments, processes can identify a multi-dimensional stiffness of the grasp. A stiffer grasp implies more displacement resistance to disturbance forces and/or increased contact force due to muscle stiffening with tension. Alternatively, or conjunctively, processes in accordance with many embodiments of the invention can use an energy-tracking approach. Energy-tracking approaches can be more immune to noise and provide a scalar measure of grasp security. In many embodiments, energy-tracking approaches can track an average stiffness in multiple directions.

In several embodiments, the human's grasp may be modeled with springs. It may be modeled that there are springs between the human's fingers and the object the human is trying to grasp. It is the stiffness of these springs that are being determined. If the human exerts a loose and floppy grasp, and therefore a non-secure grasp, the presently disclosed method detects this poor grasp (it is a loose grasp instead of a stiff and secure grasp). The robot may not let go yet, because the robot perceives the non-secure grasp. When the human grasps the object with greater force, the stiffness of the grasp is caused to increase, making the grasp more secure. It is this stiffness that can be determined and use to infer that the human is exerting a more force—a stronger and more secure grasp.

A stiff grasp may be more secure for two reasons: having a stiff grasp infers that the human is gripping the object with more force—1) this extra force may make it less likely that an inadvertent collision force will knock the object out of the grasp and 2) that it will not be displaced severely for forces of smaller magnitude than those the knock the object out. More forceful grasps may increase the stiffness of a grasp for two reasons: 1) muscle gets stiffer with an increase in the force it is exerting, and 2) as the grasp force increases the area of contact with the fingers increases this causes a second source of stiffening as more flesh becomes engaged with the object they are grasping. So from increased stiffness, it can be inferred that the grasp is more secure.

In some embodiments, the human's grasp may be modeled with springs. To create a 3 degrees of freedom (DOF) spring, 3 springs may be modeled as attached to a point movable in 3D space. The other ends of the springs may be attached to stationary points and aligned (for example) with the x, y, and z axis. If the point is moved in different directions, the springs may exert restoring forces, which may vary depending on the direction of displacement. This multidimensional spring can be represented as a 3×3 matrix. While moving the point in different directions, there may be a certain direction which the robot experiences maximum stiffness. Likewise, other directions resist motion with minimum and an in-between stiffnesses. This can be visualized as a stiffness ellipsoid with its three principal axes corresponding to the directions and magnitudes of the principal stiffnesses. These may be eigenvectors and eigenvalues of the stiffness matrix. The fact that the searched parameters are inherent properties of the matrix allows retrieval of them even if there is a given angle between the robot and the human hand. This analysis also applies to 6 DOF stiffnesses which can be visualized as a stiffness ellipsoid in 6 directions.

Figure 2:
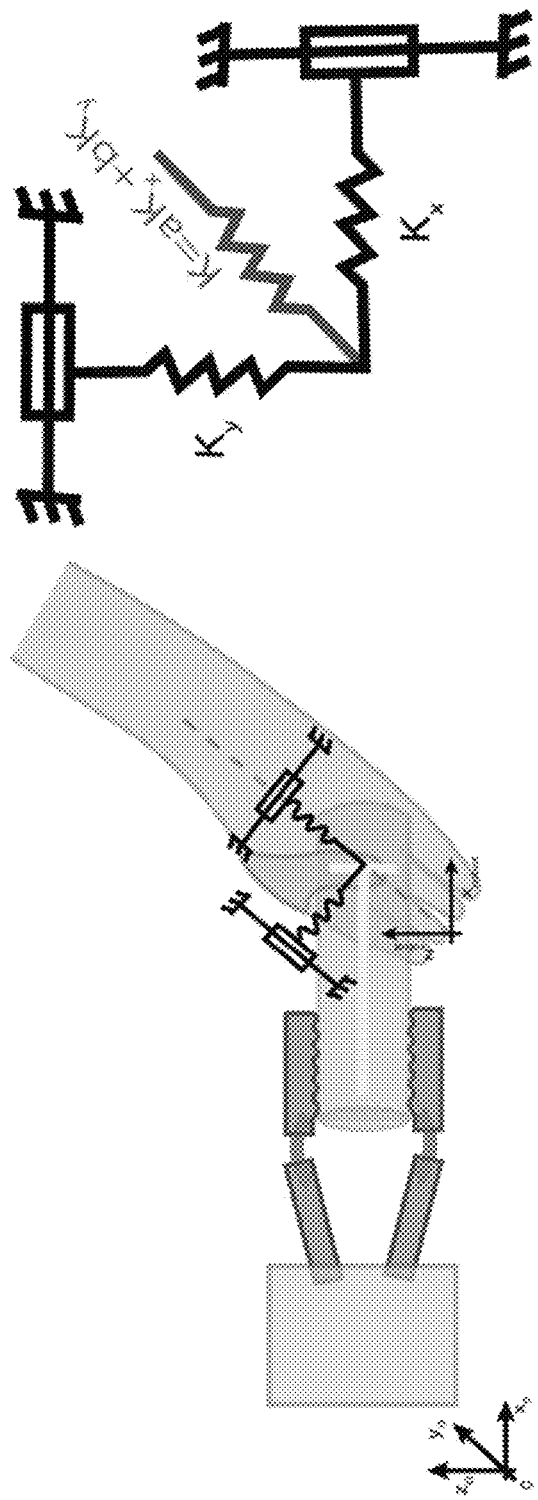
FIG. 2 illustrates an example of a model of the impedance of a human's grasp on an object as a 3-dimensional spring.

An example of a model of the impedance of a human's grasp on an object as a 3-dimensional spring is illustrated in FIG. 2. With small movements and signals, the grasp stiffness can be assumed to be locally linear. For planar experiments the grasp can be modeled with two orthogonal springs, Kx and Ky, as illustrated in FIG. 2. The orthogonal springs represent the human's grasp stiffness in two dimensions. Using a simplistic model of human muscle, processes in accordance with various embodiments of the invention can treat it as a non-linear spring with a stiffness that is modulated by muscle activation—greater force exertion increases the (local) stiffness. For a given small interrogating displacement, a higher stiffness will be detected when the human's muscle activation level is more intense. When a higher grasp stiffness is detected, it can be determined that a tighter and more secure grasp is occurring. This local linearized model can be described by a stiffness matrix. With orthogonal springs in the (x,y) plane:

$$K_{(x,y)} = \begin{bmatrix} \frac{\partial Fx}{\partial x} & \frac{\partial Fx}{\partial y} \\ \frac{\partial Fy}{\partial x} & \frac{\partial Fy}{\partial y} \end{bmatrix} = \begin{bmatrix} K_x & 0 \\ 0 & K_y \end{bmatrix}$$

By pushing on this multi-dimensional spring several times and measuring the force and position changes, the stiffness matrix values can be computed and its eigenvalues can be determined:

$$K_{(x',y')} = R_\theta^{-1} \begin{bmatrix} K_x & 0 \\ 0 & K_y \end{bmatrix}, \ eig(K) = \{K_x, K_y\}$$

Knowledge of K sufficiently characterizes the grasp. While the planar case is illustrated in this example, the same analysis can be generalized to 3 dimensions, as well as to 6 or more dimensions.

In some embodiments, starting from a steady position, a robot may move to disturb and investigate the stiffness (or more generally, impedance) of whatever the robot is contacting. This action may be referred to as active perception or active interrogation of the environment by the robot. In a variety of embodiments, each interrogation is performed in a period similar to the characteristic time of a human handover (e.g., between 0.3 s and 0.8 s) and quickly enough for properties of the human stiffness not to change significantly during probing. During its movement, the robot may record the position and force data of the end effector. If these exploratory motions are sufficiently rich, the data can be used to determine the stiffness of the human's grasp on the object being transferred. This information can be represented by a stiffness matrix (or higher order representations). Thus, the robot may measure the stiffness profile, or more precisely, the stiffness matrix, K=df/dx, to encode the physical information it has gathered. A grasp may be compliant in one direction but not in others. For example, when an individual places a bottle on his or her hand, it may be secured relatively stiffly in the vertical direction, but rather compliantly in the directions where it may fall. In some embodiments, the robot may perform a frequency sweep to have a complete system identification of the human's grasp of the object. In some embodiments, the stiffness matrix may be used to calculate the stiffness ellipsoid. The stiffness ellipsoid may have the same information as the stiffness matrix—it may be a geometric representation of the information in the stiffness matrix, and helps visualize its properties.

What is of ultimate interest is the force and position data of where the human is grasping. The human's hand which is grasping the object may be considered the end effector. Thus, it may be critical to capture force and position data at this point regardless of the fact that the force sensor is moving or not. The goal of active interrogation may not be to make the force sensor move as long as it is able to measure the force of the grasp at the end effector.

The stiffness profile may be defined as the stiffness field of a given environment (for a given position of the robot compared to the human). The stiffness matrix may be defined as the matrix computed at each time of the stiffness in each direction (and considering coupled stiffnesses). The stiffness ellipsoid may be defined as a 2D representation of the stiffness profile, properties of the stiffness ellipsoid may be lined to the stiffness matrix.

In various embodiments, grasp stiffness can be computed using an energy based technique. Energy-based techniques can be beneficial when force and position readings from an interrogating robot are too noisy and/or the non-linearities of the system are significant. This measurement in accordance with a variety of embodiments of the invention averages the data by looking at the geometric average of the stiffnesses and by averaging energy over one interrogation (e.g., one circular motion).

Energy-based techniques can look at the potential energy stored by the springs. Processes in accordance with certain embodiments of the invention can define an equivalent spring as the spring storing the combined energy in both springs for a given displacement u. Thus, two springs in x and y directions can be seen as a unique spring of global stiffness K, global displacement u, and potential energy $E_p$:

$$K = \sqrt{K_x^2 + K_y^2}, u = \sqrt{x^2 + y^2}, E_p = \frac{1}{2}Ku^2$$

This energy will increase when the stiffnesses and contact forces become larger, indicating a stronger grasp. From the robot's point of view, the following energy balance equation applied to the end-effector and its motor can be written:

$$W_{actuator} = \Delta E_k + \Delta E_{p,springs} + 0_{grav} - \delta L_{visc} - \delta L_{heat} - L_{fric}$$

This equation includes all the possible losses due to motor heating and friction as well as damping in the contacts. By modeling the contact only as a spring, all losses can be ignored or at least considered to be quite small in magnitude compared to kinetic or potential energy variations. There is no gravitational potential energy variation because the robot does not move in the Z direction. The actuator work mainly affects the kinetic and potential energy of the system. When an operator grasps the object held by the robot, the robot will slow down or stay at the same speed, which lead to a lower kinetic energy of the end-effector. Thus, a variation of the actuator work will come from a variation of the spring potential energy. If the robot is well-controlled, u is kept close to the radius of the circular trajectory. An increase of the potential spring energy can only come from an increase of the global stiffness K. This can be considered to be an increase of the security of the grasp.

Since the robot is following circles at a period T, the robot in accordance with a variety of embodiments of the invention needs to finish interrogating in all directions before deducing the properties of a grasp. Consider the temporal mean value of the potential energy over the last cycle of each circular motion:

$$\langle E_p \rangle_t(t) = \frac{1}{T} \int_{t-T}^{t} E_p(w) dw$$

Assuming the variation of u are small, this integral represents the average of the stiffness felt in each direction. A tight grasp is a grasp stiff in all directions and will thus be associated to a high mean energy.

In several embodiments, to evaluate the security of a grasp, measured stiffness ellipses can be compared to a predefined stiffness ellipse which represents the minimum grasp stiffness required for a secure grasp. Processes in accordance with a variety of embodiments of the invention can create a reference ellipse specifying the principal stiffness in orthogonal directions, which can be referred to as the limit ellipse. Having defined a scalar energy metric, the value of the metric can be compared between the measured ellipse and the limit ellipse. In a variety of embodiments, the limit ellipse can be estimated using the mass of the grasp object.

The grip force applied to hold an object is a linear function of the load force (said differently, the grip force on load force ratio is constant), which is the weight of the object. This results as a consequence of the Coulomb friction law. Since the contact between the fingers and the object is modeled as springs, the grip force is proportional to the stiffness of the springs (for a given displacement). Hence, processes in accordance with a number of embodiments of the invention introduce two limit stiffnesses. They represent the minimum stiffnesses that should be applied by a human to hold an object of a given mass. They also give the principal and secondary radius of the limit stiffness ellipse to which the measured ellipse should be compared. To model the link between the mass and the grip force, consider stiffnesses as linear functions of the mass:

$$\begin{cases} K_x^{lim} = a + b * m_{object} \\ K_y^{lim} = c + d * m_{object} \end{cases}, k^{lim} = \sqrt{K_x^{lim^2} + K_y^{lim^2}}$$

These are theoretical values and do not need to be known precisely. They allow for the definition of the limit ellipse introduced before. If the measured ellipse becomes bigger than the limit one, it means the robot detects a sufficiently large stiffness, and that a secure grasp has been attained by the human receiver. To compare the limit and measured ellipses, the energy that is taking into account not only K but also the displacement u can be used. Hence, the two ellipses can be compared by comparing the potential energy associated with each of them:

$$\frac{1}{T}\int_{t-T}^{t}\frac{1}{2}K(w)u(w)^2 dw > \frac{1}{T}\int_{t-T}^{t}\frac{1}{2}K^{lim}(w)u(w)^2 dw$$

Or:

$$\frac{1}{T}\int_{t-T}^{t}\frac{1}{2}(K(w) - K^{lim}(w))u(w)^2 dw > 0$$

The meaning of this inequality is that, on average for successful grasps, the energy of the human grasp was higher than the minimum energy to hold the object. To consider every direction once, the computation can be made for one period of time (e.g., one performed circle). Increasing the value of the limit stiffnesses will lead to more security in the object's transfer, and lower the values will lead to quicker, though less secure, transfers. A small error in the choice of the limit stiffnesses would cause a slightly quicker or slower grasp release triggering. This is why only an estimation of these stiffnesses is needed. In numerous embodiments, they can be estimated by measuring the stiffness while grasping a few objects of known mass.

An investigation may include running simulations to compute the stiffness profile of complex situations (with a few springs and different ways of attaching them). A test set may be created that the robot may be able to retrieve to validate the stiffness profile of this setup. Using robot movement to measure human arm stiffness has previously been discussed, but these previous references do not investigate the human's grasp stiffness. The robot movements during measurement may be defined as active interrogation or perception. In some embodiments, the stiffness profile may be used to isolate the human's grasp stiffness. The stiffness of the grasp may be linked with muscle activation and stability of the human's hold of the object. This is different from the human hand/arm stiffness which may be mechanical properties of the body in a given situation. The stiffness of the human's grasp may be primarily modulated by grip force. Others' work has sought to determine the properties of the human arm (e.g. how massive is someone's forearm, is the person holding their arm rigidly, do they have strength deficits, etc.). The presently disclosed technique measures the stiffness with which a human holds an object, which is very different from measuring arm mass, shoulder stiffness or other portions of the human.

Various other references discuss methods of performing human-robot handoffs including measuring (at the robot wrist) sudden onset of forces and using this information as a signal that the robot can let go. These approaches assume that as soon as the human exerts some force (above a certain threshold) on the object being passed that it is okay for the robot to release the object being passed. This may be an erroneous assumption that once the human begins to support the weight of the object that they have a secure grasp. It has been discovered that the grasp stiffness, which is a much more sophisticated measure of grasp security, can be measured by active interrogation or perturbation of the system.

In some embodiments, the active interrogation may include a short motion in several directions. In some embodiments, the active interrogation may include a motion including frequency and amplitude changes. Other motions can be used, even random, but in order to assess grasp stiffness, the robot may try to move the object being held by the human in order to reveal the rate of force increase with displacement. This rate of force increase with displacement of the object may be the definition of grasp stiffness.

Different situations may be used to train the robot to property handoff the object. In some embodiments, a neural network may be used which may be trained based on different grasps. The stiffness profile may be split between those which correspond to a secured and an unsecured grasp. A grasp is secured when the object does not fall when the robot releases it and unsecured when the object falls after the object is released. Some embodiments may include comparing the secure and unsecured grasp to a test set of known stiffness situations. A pattern or a type of profile that is a characteristic of the grasp's security may be recognized. A secure grasp may have two properties. It may require that the object is being grasped by the human with large force (which can be inferred from measuring the human's grasp stiffness.) . Stiffness also has intrinsic value in that it helps minimize accidental displacement of the object due to collision or other unexpected forces.

The active interrogation motions of the robot may vary widely. Path, amplitude, speed, frequency etc. may be adjusted and/or altered. In some embodiments, the robot may be able to discriminate stiffness profiles and stiffness magnitude for different security of grasp using the active perception technique. This may be achieved by finding the key parameters that active perception may retrieve. Active perception or interrogation may be efficient with minimal equipment. In comparison, various references discuss human quality of grasp using embedded objects (e.g. sensors embedded in the object or positioned on the object). However, active interrogation may aid in human-robot handoffs without the use of complex sensors. Embedding sensor within the object may be a poor long term solution. Active interrogation may be used to determine a particular time for a pre-handoff situation.

Some embodiments of the presently disclosed technology enable robots to hand objects safely to humans. Various disclosed embodiments include a method that monitors the secureness (quality) of a human recipient's grasp. Once the robot detects that the human has a secure grasp on the object the robot may let go of the object. In order to measure the human grasp security during a handover, the stiffness of the human's grasp may be measured. Because human muscle becomes stiffer with load, when the human detects a stiff grasp, the human can infer that the grasping forces are large, making the object more resistant to disturbance forces resulting from acceleration and collision. A stiff grasp also ensures accurate motion tracking.

To determine a grasp's stiffness the robot may impose small motions on the grasped object, measure the resulting force changes, and then compute the grasp stiffness or impedance. While previous research focuses on applying varying forces to determine the impedance of the human arm, previous research does not involve grasp impedance, and may involve different purposes. Previous research seeks bio-mechanical information rather than perceptual information. Other studies in robot to human-robot handovers typically use force and acceleration thresholds and/or visual cues to identify the moment to let go. Various embodiments of the present disclosure differ in that the methods track more subtle aspects (e.g. stiffness or impedance) of the physical handover process. With this supply of rich sensory information the presently disclosed method can make a more reasoned decision about when (and how) to let go.

Two types of works exist in previous literature linked to human robot interaction. The first type is the estimation of the overall stiffness of the human arm's endpoint with a robot. The second type is focused on human-to-robot object handover, and especially the release time. They mainly use force data to sense the recipient's exerting a lift force action or vision to determine the timing of grasp actions.

Various presently disclosed embodiments are different from the previous literature because they use a stiffness estimation technique during a handover action. Further, none of the previous literature discusses active interrogation where the robot is moving before or during the handover to interrogate human properties. Previous literature related to human-robot handover focuses on force thresholding and/or vision, but none of the techniques from previous references use human grip stiffness as a key property for mediating the handover. The disclosed techniques do not measure the overall stiffness of the endpoint of the human arm, but only the stiffness linked to the grasp security. Various embodiments of the presently disclosed may function for a given arm position and different grasp types. Various embodiments may be able to detect if a human is holding the object or not with the movements of the robot arm. Various embodiments may be able to classify the security of the grasp based on the stiffness data. This is new because in previous references, only vision or force thresholds were used to classify the security of the grasp. In some embodiments, the movements of the robot for active interrogation may not be perceptible to the human.

Figure 3:
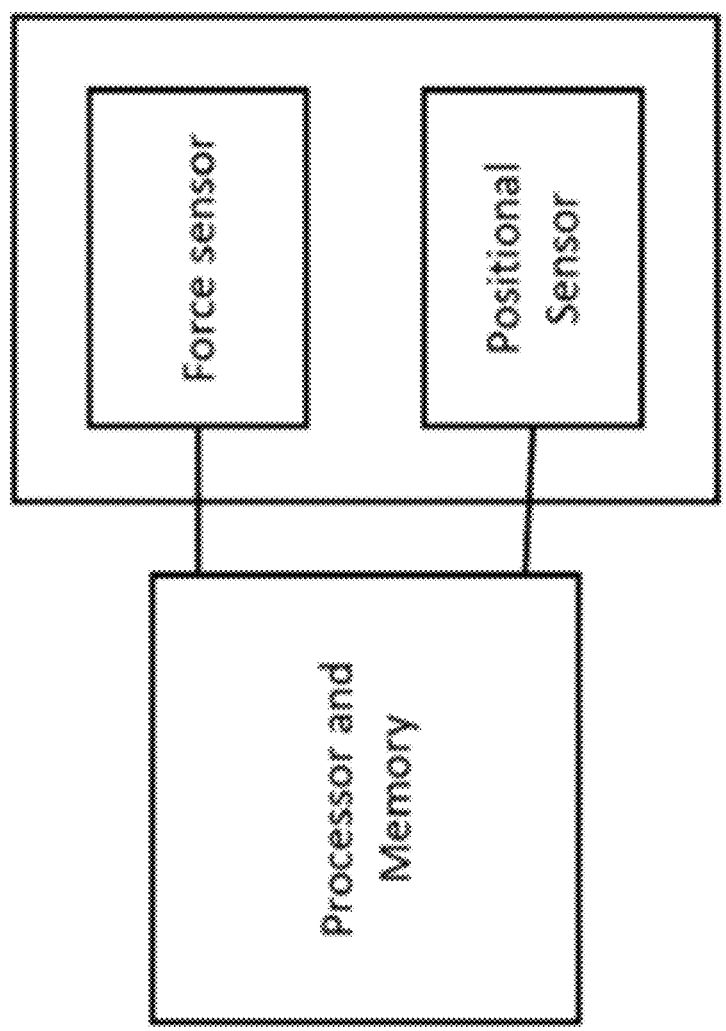
FIG. 3 illustrates a block diagram of an example of the hand of a robot in accordance with certain embodiments of the invention, which includes a force sensor and a positional sensor.

A block diagram of an example of the hand of a robot in accordance with certain embodiments of the invention, which includes a force sensor and a positional sensor, is illustrated in FIG. 3. In some embodiments, the positional sensor is not present if the joint positions are known with enough precision. As long as the position of where the human is grasping the object is known with enough precision, a positional sensor may not be necessary. The force sensor may be located the wrist and/or joints of the robot. The force sensor may be used to measure force variations at the robot's force sensor in order to calculate the stiffness of the human's grasp on the object being passed to or from the human. The robot's motions (active interrogation) can be any amplitude and frequency and can be over an arbitrary path. In some embodiments the robot's motions may be a small circular motion to interrogate the force changes. The speed and/or frequency of these motions may be selected to best reveal the stiffness of the grasp. It may be useful to vary the frequency of the interrogation motions such as a frequency sweep to better quantify the dynamic elements. The dynamic elements may include mass stiffnesses of the system including the grasp stiffness.

In some embodiments, the force sensor may be located in several locations (or combinations of them) on the robot. In some embodiments, the force sensor may be located at the distal end of the robot's hand. This type of sensor is typically called a "wrist force sensor". The robot's end-effector (hand) may be located distally from this force sensor. Alternately, force sensors may be located at the joints or even the base of the robot. One problem with this approach may be that there may be complex arm dynamics between the sensors and the desired location to determine the stiffness of the grasp.) Another alternative may be to use force (or tactile) sensors on the fingers and fingertips. The problem with this approach may be that tactile sensors may not be physically robust, and may be an excessively complex for the task of mediating robot to human handovers. Any, or combinations, of these sensor locations may be used to measure variations in force due to interrogation motions.

The hand of the robot may be connected to an arm which may include an arm mass. The arm may be connected to a motor, servo, and/or actuators which may allow the arm to make subtle movements or wiggles which may be used to perform active interrogation as described above. The force sensor and positional sensor may be in communication with a processor and memory which may have programming executable to compute grip stiffness as described above. The programming may also adjust the robot's grip of the object based on the computed grip stiffness.

B. Gesture Classification

Systems and methods in accordance with numerous embodiments of the invention can utilize models capable of distinguishing between at least four classes of human tactile gestures at a robot's end effector, using only a force sensor such as a non-collocated six-axis force sensor at the wrist. In a number of embodiments, gesture classification can be used in conjunction with grip stiffness when evaluating a handoff. For example, in some embodiments, processes can use different thresholds for grip stiffness based on a classification of sensor signals identifying a gesture as a grasp.

Embodiments of the invention include 1) the collection of an extensive force dataset characterized by human-robot contact events, and 2) classification models informed by this dataset to determine the nature of the interaction. It has been demonstrated that high classification accuracies among gesture definitions on a test set are possible, emphasizing that neural network classifiers on the raw data outperform several other combinations of algorithms and feature sets.

Embodiments of the invention relate to incorporation of tools such as machine learning tools to assist robotic systems with interpreting contact with their environments. In certain embodiments a gesture interpretation device includes a force sensor and a gesture classifying unit which is fed force data. First, the force data is obtained which may include data from a tactile gesture. The gesture classifying unit may be configured to determine one or more snippets of the force sensor data; calculate one or more features from the one or more snippets; and classify the one or more features in order to identify the tactile gestures. The one or more features may include but is not limited to one or more of raw force data, slope, duration of high slope, curvature, duration of high curvature, standard deviation, third-order polynomial fit, tap profile, spectrogram slice linear approximation, spectral rolloff, centroid, flatness, or compressed version of other features including but not limited to principal component analysis, independent component analysis, or autoencoder model bottlenecks. Classifying the one or more features may be performed by but is not limited to a decision tree, a support vector machine (SVM), or a neural network classifier.

Advantageously, by processing the force data in the gesture classifying unit in such a manner, the gesture interpretation device is able to determine the presence and type of tactile gesture from a set of gestures. The set of gestures may include but is not limited to a tap gesture, a touch gesture, a grab gesture, and a slip gesture. In some embodiments, the force sensor may be a single channel force sensor or a multi-channel force sensor. The multi-channel force sensor may be a multi-axis force sensor with each channel corresponding to an axis. Other sensors may be used instead of, or in addition to, a force sensor. These include but are not limited to use of cameras and/or accelerometers.

In some embodiments, the gesture interpretation device may be at least partially located on a robotic system which includes a method for moving the force sensor. In some embodiments the force sensor is moved or wiggled while gathering data. The force sensor may be moved in one direction or multiple directions. Advantageously, moving the force sensor enables active interrogation of an object's properties by stimulating additional sensor output. Other means of causing relative motion between the human and the robot may be employed. For example, the giver or recipient of an object may be standing on a moving platform. Methods for classifying tactile gestures in accordance with various embodiments of the invention can be used in other contexts where detecting and discriminating content interactions is useful. Examples include cell phones and control panels.

C. Systems for Facilitating a Handoff

1. Handoff System

Figure 4:
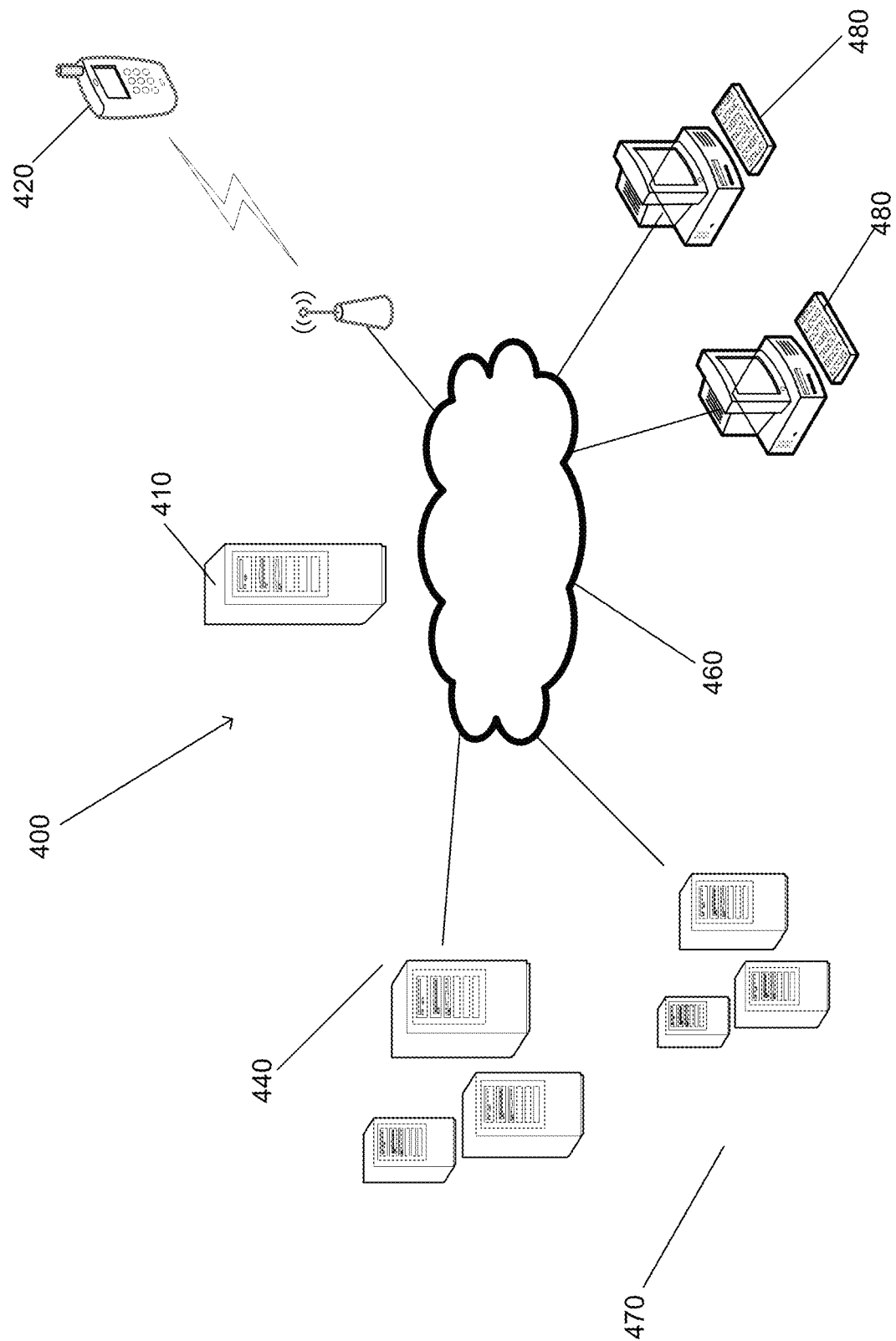
FIG. 4 illustrates an example of a handoff system that facilitates a handoff in accordance with an embodiment of the invention.

An example of a handoff system that facilitates a handoff in accordance with an embodiment of the invention is illustrated in FIG. 4. Network 400 includes a communications network 460. The communications network 460 is a network such as the Internet that allows devices connected to the network 460 to communicate with other connected devices. Server systems 410, 440, and 470 are connected to the network 460. Each of the server systems 410, 440, and 470 is a group of one or more servers communicatively connected to one another via internal networks that execute processes that provide cloud services to users over the network 460. One skilled in the art will recognize that a handoff system may exclude certain components and/or include other components that are omitted for brevity without departing from this invention.

For purposes of this discussion, cloud services are one or more applications that are executed by one or more server systems to provide data and/or executable applications to devices over a network. The server systems 410, 440, and 470 are shown each having three servers in the internal network. However, the server systems 410, 440 and 470 may include any number of servers and any additional number of server systems may be connected to the network 460 to provide cloud services. In accordance with various embodiments of this invention, a handoff system that uses systems and methods that facilitate a handoff in accordance with an embodiment of the invention may be provided by a process being executed on a single server system and/or a group of server systems communicating over network 460. For example, systems in accordance with a variety of embodiments of the invention may train gesture interpretation models on a first set of servers, predict gestures on a second set of devices, and measure and compute grip stiffness on a third set of devices.

Users may use personal devices 480 and 420 that connect to the network 460 to perform processes that facilitate a handoff in accordance with various embodiments of the invention. In the shown embodiment, the personal devices 480 are shown as desktop computers that are connected via a conventional "wired" connection to the network 460. However, the personal device 480 may be a desktop computer, a laptop computer, a smart television, an entertainment gaming console, or any other device that connects to the network 460 via a "wired" connection. The mobile device 420 connects to network 460 using a wireless connection. A wireless connection is a connection that uses Radio Frequency (RF) signals, Infrared signals, or any other form of wireless signaling to connect to the network 460. In the example of this figure, the mobile device 420 is a mobile telephone. However, mobile device 420 may be a mobile phone, Personal Digital Assistant (PDA), a tablet, a smartphone, or any other type of device that connects to network 460 via wireless connection without departing from this invention.

As can readily be appreciated the specific computing system used to facilitate a handoff is largely dependent upon the requirements of a given application and should not be considered as limited to any specific computing system(s) implementation.

2. Handoff Element

Figure 5:
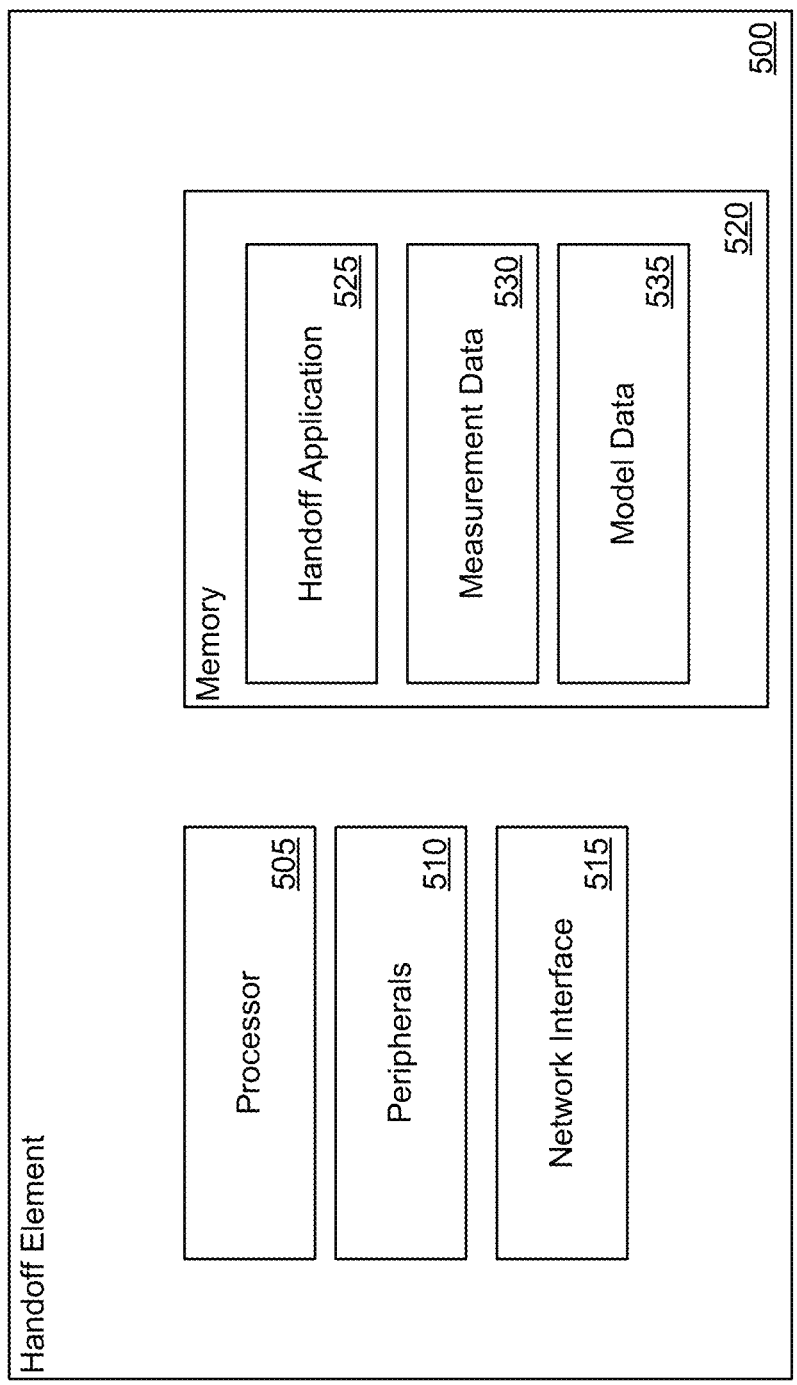
FIG. 5 illustrates an example of a handoff element that executes instructions to perform processes that facilitate a handoff in accordance with an embodiment of the invention.

An example of a handoff element that executes instructions to perform processes that facilitate a handoff in accordance with an embodiment of the invention is illustrated in FIG. 5. Handoff elements in accordance with many embodiments of the invention can include (but are not limited to) one or more of mobile devices, cameras, and/or computers. Handoff element 500 includes processor 505, peripherals 510, network interface 515, and memory 520. One skilled in the art will recognize that a handoff element may exclude certain components and/or include other components that are omitted for brevity without departing from this invention.

The processor 505 can include (but is not limited to) a processor, microprocessor, controller, or a combination of processors, microprocessor, and/or controllers that performs instructions stored in the memory 520 to manipulate data stored in the memory. Processor instructions can configure the processor 505 to perform processes in accordance with certain embodiments of the invention. In various embodiments, processor instructions can be stored on a non-transitory machine readable medium.

Peripherals 510 can include any of a variety of components for capturing data, such as (but not limited to) cameras, force sensors, tactile sensors, accelerometers, displays, and/or other sensors. In a variety of embodiments, peripherals can be used to gather inputs and/or provide outputs. Handoff element 500 can utilize network interface 515 to transmit and receive data over a network based upon the instructions performed by processor 505. Peripherals and/or network interfaces in accordance with many embodiments of the invention can be used to gather inputs that can be used to facilitate a handoff.

Memory 520 includes a handoff application 525, measurement data 530, and model data 535. Handoff applications in accordance with several embodiments of the invention can be used to facilitate a handoff. Measurement data in accordance with a number of embodiments of the invention can include data collected from a set of one or more sensors. In certain embodiments, measurement data can be used to compute grip stiffness and/or to classify gestures.

In several embodiments, model data can store various parameters and/or weights for various models that can be used for various processes as described in this specification. Model data in accordance with many embodiments of the invention can be updated through training on measurement captured on a handoff element or can be trained remotely and updated at a handoff element.

Although a specific example of a handoff element 500 is illustrated in this figure, any of a variety of handoff elements can be utilized to perform processes for facilitating a handoff similar to those described herein as appropriate to the requirements of specific applications in accordance with embodiments of the invention.

3. Handoff Application

Figure 6:
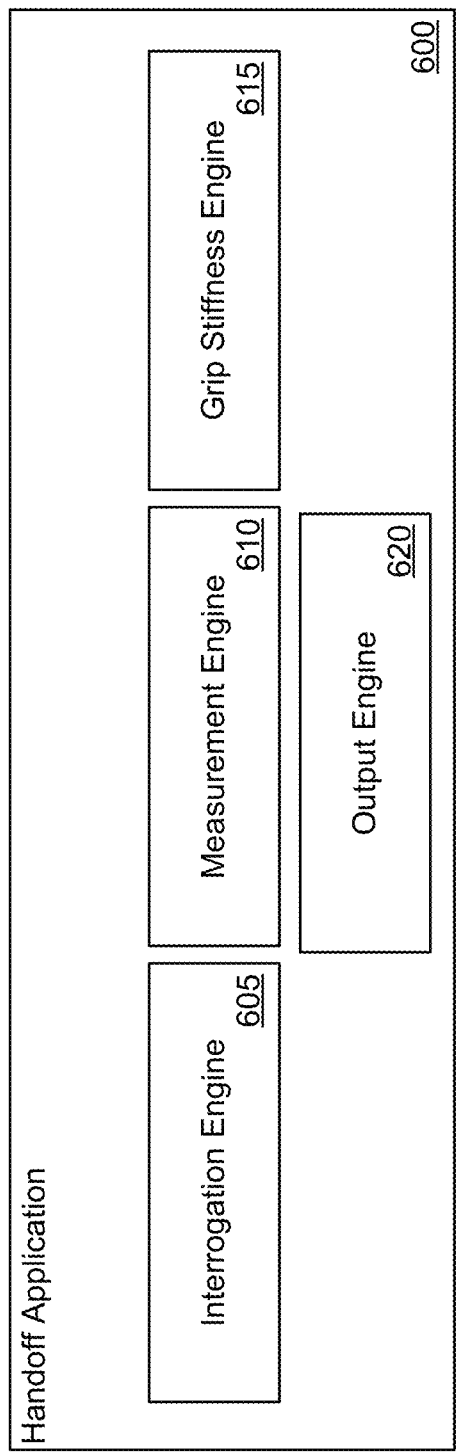
FIG. 6 illustrates an example of a handoff application for facilitating a handoff in accordance with an embodiment of the invention.

An example of a handoff application for facilitating a handoff in accordance with an embodiment of the invention is illustrated in FIG. 6. Handoff application 600 includes interrogation engine 605, measurement engine 610, grip stiffness engine 615, and output engine 620. One skilled in the art will recognize that a handoff application may exclude certain components and/or include other components that are omitted for brevity without departing from this invention.

Interrogation engines in accordance with certain embodiments of the invention can be used to control a robot to move an object to interrogate a grip stiffness of a receiver in various ways, as described throughout this specification. For example, interrogation engines in accordance with certain embodiments of the invention can move an object in a small circular motion, in random patterns, with various frequencies, etc.

In a number of embodiments, measurement engines can collect and process measurements from a variety of sensors in various ways, as described throughout this specification. For example, measurement engines in accordance with a variety of embodiments of the invention collect measurements from a force sensor positioned at the wrist of a robot to determine grip stiffness.

Grip stiffness engines in accordance with certain embodiments of the invention can compute grip stiffness in various ways, as described throughout this specification. For example, grip stiffness engines in accordance with a number of embodiments of the invention can analyze the displacement of an object and/or use energy tracking to determine grip stiffness. In certain embodiments, grip stiffness engines can be used to determine whether to release and/or grip an object based on the determined grip stiffness. In several embodiments, grip stiffness engines can also utilize classifications (e.g., from a classification engine (not shown)) to supplement the determination of whether to release and/or grip an object.

Output engines in accordance with several embodiments of the invention can provide a variety of outputs, including (but not limited to) control signals to control a robot, gesture classifications, grip stiffness levels, etc.

Although a specific example of a handoff application is illustrated in this figure, any of a variety of handoff applications can be utilized to perform processes for facilitating a handoff similar to those described herein as appropriate to the requirements of specific applications in accordance with embodiments of the invention.

Although specific methods of facilitating a handoff are discussed above, many different methods of facilitating a handoff can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for controlling a robot to handoff an object, the method comprising:
   presenting an object to a receiver, wherein the receiver grasps the object upon being presented with the object;
   moving, using a robot arm, the object to interrogate a grip stiffness of the receiver;
   measuring a response by the receiver to the moving using a set of one or more sensors equipped on the robot arm;
   computing the grip stiffness of the receiver based on the measured response; and
   determining whether to release the object to the receiver based on the computed grip stiffness of the receiver.

2. The method of claim 1, wherein moving the object comprises moving the object in a circular pattern.

3. The method of claim 1, wherein moving the object comprises moving the object in a randomized pattern.

4. The method of claim 1, wherein moving the object comprises moving the object at a specified frequency.

5. The method of claim 1, wherein moving the object comprises moving the object at a plurality of different frequencies.

6. The method of claim 1, wherein moving the object comprises moving the object along a specified path for a number of revolutions, where a period of each revolution is between 0.3s and 0.8s.

7. The method of claim 1, wherein measuring a response by the receiver comprises measuring at least one selected from the group consisting of a magnitude, orientation, velocity, impedance, and acceleration.

8. The method of claim 1, wherein the set of sensors comprises a sensor at a distal end of a robot hand.

9. The method of claim 8, wherein computing the grip stiffness is based on a displacement of the object and a measured force at the sensor at the distal end of the robot hand.

10. The method of claim 1, wherein the set of sensors comprises at least one selected from the group consisting of a joint force sensor, tactile sensor, an accelerometer, and an image sensor.

11. The method of claim 1, wherein measuring the response comprises measuring a response in each of a plurality of different directions.

12. The method of claim 1, wherein computing the grip stiffness comprises applying a band-pass filter to the measured response.

13. The method of claim 1, wherein computing the grip stiffness comprises modeling a grasp of the object as a plurality of orthogonal springs.

14. The method of claim 1, wherein computing the grip stiffness comprises computing a potential energy in a modeled set of springs to define an equivalent spring storing a combined energy in the modeled set of springs for a given displacement.

15. The method of claim 1, wherein computing the grip stiffness comprises computing an average stiffness in a plurality of directions around the object.

16. The method of claim 1, wherein computing the grip stiffness comprises computing a grip stiffness for each of a plurality of directions around the object.

17. The method of claim 16, wherein the grip stiffness is represented as at least one selected from the group consisting of a matrix and an ellipse.

18. The method of claim 1 further comprising performing a classification for a gesture based on the measured response, wherein determining whether to release the object is further based on the classification.

19. The method of claim 18, wherein the classification is used to predict at least one selected from the group consisting of a gesture type and a grasp quality.

20. The method of claim 1, wherein determining whether to release the object comprises:
   comparing the computed grip stiffness to a threshold grip stiffness; and
   determining to release the object when the computed grip stiffness exceeds the threshold grip stiffness for a predetermined period of time.

* * * * *